(12) United States Patent
Weicker et al.

(10) Patent No.: US 11,251,494 B2
(45) Date of Patent: Feb. 15, 2022

(54) ELECTRIC VEHICLE BATTERY ENCLOSURE

(71) Applicant: Canoo Technologies Inc., Torrance, CA (US)

(72) Inventors: Phillip John Weicker, Torrance, CA (US); David Tarlau, Torrance, CA (US); Deborah Bourke, Torrance, CA (US); Alexi Charbonneau, Torrance, CA (US); Daniel McCarron, Torrance, CA (US)

(73) Assignee: Canoo Technologies Inc., Torrance, CA (US)

( * ) Notice: Subject to any disclaimer, the term of this patent is extended or adjusted under 35 U.S.C. 154(b) by 0 days.

(21) Appl. No.: 17/027,626

(22) Filed: Sep. 21, 2020

(65) Prior Publication Data

US 2021/0091352 A1    Mar. 25, 2021

Related U.S. Application Data

(60) Provisional application No. 62/903,709, filed on Sep. 20, 2019.

(51) Int. Cl.
| | |
|---|---|
| *H01M 50/20* | (2021.01) |
| *B60L 50/60* | (2019.01) |
| *H01M 50/244* | (2021.01) |
| *H01M 50/249* | (2021.01) |

(Continued)

(52) U.S. Cl.
CPC ............. *H01M 50/20* (2021.01); *B60K 1/04* (2013.01); *B60L 50/66* (2019.02); *H01M 50/204* (2021.01); *H01M 50/244* (2021.01); *H01M 50/249* (2021.01); *B60K 2001/0438* (2013.01)

(58) Field of Classification Search
CPC ............. H01M 2/1077; H01M 2/1083; H01M 2220/20; H01M 50/20; H01M 50/204; H01M 50/244; H01M 50/249; B60K 2001/0438
See application file for complete search history.

(56) References Cited

U.S. PATENT DOCUMENTS

| | | |
|---|---|---|
| 1,526,481 A | 2/1925 | Krieger |
| 2,873,994 A | 2/1959 | Ray |
| 3,170,682 A | 2/1965 | Eggers |

(Continued)

FOREIGN PATENT DOCUMENTS

| | | |
|---|---|---|
| AU | 2002323246 A1 | 3/2003 |
| AU | 2002332561 A1 | 3/2003 |

(Continued)

OTHER PUBLICATIONS

International Search Report and Written Opinion for International Application No. PCT/US2020/040788, Search completed Nov. 19, 2020, dated Dec. 22, 2020, 21 Pgs.

(Continued)

*Primary Examiner* — Jonathan G Jelsma

(57) ABSTRACT

A battery enclosure for use in an electric vehicle where the structural support members of the battery enclosure are multi-functional and act to provide support for internally positioned batteries as well as provide additional strength to the framework of the electric vehicle. Furthermore, the structural elements can provide impact resistance to prevent unwanted intrusion into the battery enclosure.

20 Claims, 14 Drawing Sheets

(51) Int. Cl.
  *H01M 50/204*  (2021.01)
  *B60K 1/04*    (2019.01)

(56) References Cited

U.S. PATENT DOCUMENTS

| | | |
|---|---|---|
| 3,429,566 A | 2/1969 | Rosendale |
| 4,148,505 A | 4/1979 | Jensen et al. |
| 4,307,865 A | 12/1981 | MacCready |
| 4,460,215 A | 7/1984 | Chamberlain et al. |
| 4,557,500 A | 12/1985 | Collard et al. |
| 4,619,466 A | 10/1986 | Schaible et al. |
| 4,779,917 A | 10/1988 | Campbell et al. |
| 4,887,841 A | 12/1989 | Cowburn et al. |
| 5,015,545 A | 5/1991 | Brooks |
| 5,069,306 A | 12/1991 | Inoue et al. |
| 5,141,209 A | 8/1992 | Sano et al. |
| 5,501,289 A * | 3/1996 | Nishikawa ............ H01M 50/20 180/68.5 |
| 5,807,205 A | 9/1998 | Odaka et al. |
| 5,827,149 A | 10/1998 | Sponable |
| 6,029,987 A | 2/2000 | Hoffman et al. |
| 6,512,347 B1 | 1/2003 | Hellmann et al. |
| 6,688,586 B1 | 2/2004 | Moore |
| 6,710,916 B1 | 3/2004 | Bolshtyansky |
| 6,712,164 B2 | 3/2004 | Chernoff et al. |
| 6,726,438 B2 | 4/2004 | Chernoff et al. |
| 6,766,873 B2 | 7/2004 | Chernoff et al. |
| 6,768,932 B2 | 7/2004 | Claypole et al. |
| 6,811,169 B2 | 11/2004 | Schroeder et al. |
| 6,830,117 B2 | 12/2004 | Chernoff et al. |
| 6,836,943 B2 | 1/2005 | Chernoff et al. |
| 6,843,336 B2 | 1/2005 | Chernoff et al. |
| 6,845,839 B2 | 1/2005 | Chernoff et al. |
| 6,857,498 B2 | 2/2005 | Vitale et al. |
| 6,880,856 B2 | 4/2005 | Chernoff et al. |
| 6,889,785 B2 | 5/2005 | Chernoff et al. |
| 6,899,194 B2 | 5/2005 | Chernoff et al. |
| 6,905,138 B2 | 6/2005 | Borroni-bird et al. |
| 6,923,281 B2 | 8/2005 | Chernoff et al. |
| 6,923,282 B2 | 8/2005 | Chernoff et al. |
| 6,935,449 B2 | 8/2005 | Chernoff et al. |
| 6,935,658 B2 | 8/2005 | Chernoff et al. |
| 6,938,712 B2 | 9/2005 | Chernoff et al. |
| 6,948,226 B2 | 9/2005 | Chernoff et al. |
| 6,959,475 B2 | 11/2005 | Chernoff et al. |
| 6,968,918 B2 | 11/2005 | Chernoff et al. |
| 6,976,307 B2 | 12/2005 | Chernoff et al. |
| 6,986,401 B2 | 1/2006 | Chernoff et al. |
| 6,991,060 B2 | 1/2006 | Chernoff et al. |
| 7,000,318 B2 | 2/2006 | Chernoff et al. |
| 7,004,502 B2 | 2/2006 | Borroni-bird et al. |
| 7,028,791 B2 | 4/2006 | Chernoff et al. |
| 7,029,017 B2 | 4/2006 | Zandbergen et al. |
| 7,036,848 B2 | 5/2006 | Chernoff et al. |
| 7,083,016 B2 | 8/2006 | Chernoff et al. |
| 7,096,986 B2 | 8/2006 | Borroni-bird et al. |
| 7,104,581 B2 | 9/2006 | Chernoff et al. |
| 7,111,900 B2 | 9/2006 | Chernoff et al. |
| 7,213,673 B2 | 5/2007 | Shabana et al. |
| 7,275,609 B2 | 10/2007 | Chernoff et al. |
| 7,281,600 B2 | 10/2007 | Chernoff et al. |
| 7,292,992 B2 | 11/2007 | Chernoff et al. |
| 7,303,033 B2 | 12/2007 | Chernoff et al. |
| 7,303,211 B2 | 12/2007 | Borroni-bird et al. |
| 7,360,816 B2 | 4/2008 | Chernoff et al. |
| 7,370,886 B2 | 5/2008 | Luttinen et al. |
| 7,373,315 B2 | 5/2008 | Chernoff et al. |
| 7,398,846 B2 | 7/2008 | Young et al. |
| 7,441,615 B2 | 10/2008 | Borroni-bird et al. |
| 7,469,956 B2 | 12/2008 | Yasuhara et al. |
| 7,520,355 B2 | 4/2009 | Chaney |
| 7,597,169 B2 | 10/2009 | Borroni-bird et al. |
| 7,681,943 B2 | 3/2010 | Murata et al. |
| 7,936,113 B2 | 5/2011 | Namuduri et al. |
| 8,143,766 B2 | 3/2012 | Namuduri et al. |
| 8,253,281 B2 | 8/2012 | Namuduri et al. |
| 8,308,148 B2 | 11/2012 | Shand |
| 8,448,696 B2 | 5/2013 | Johnston et al. |
| 8,485,543 B2 | 7/2013 | Richardson et al. |
| 8,556,282 B2 | 10/2013 | Pollmeyer et al. |
| 8,640,806 B2 | 2/2014 | Worup et al. |
| 8,881,883 B2 | 11/2014 | Barton et al. |
| 8,936,265 B2 | 1/2015 | Ehrlich et al. |
| 8,940,425 B2 | 1/2015 | Toepfer |
| 9,162,546 B2 | 10/2015 | Girelli Consolaro et al. |
| 9,566,840 B2 | 2/2017 | Seethaler et al. |
| 9,627,721 B2 | 4/2017 | Kosaki et al. |
| 9,676,418 B1 | 6/2017 | Mohammed et al. |
| 9,682,727 B2 | 6/2017 | Tanaka et al. |
| 9,751,565 B2 | 9/2017 | Tatsuwaki et al. |
| 9,988,100 B2 | 6/2018 | Kim et al. |
| 10,131,381 B2 * | 11/2018 | Ashraf ...................... B60K 1/04 |
| 10,293,860 B1 | 5/2019 | Cooper et al. |
| 10,336,369 B2 | 7/2019 | Viaux et al. |
| 10,486,513 B2 | 11/2019 | Battaglia et al. |
| 10,632,857 B2 * | 4/2020 | Matecki ................... B60K 1/04 |
| 10,741,809 B2 * | 8/2020 | Kim ........................ B60K 1/04 |
| 2002/0149490 A1 | 10/2002 | Butler et al. |
| 2003/0037427 A1 | 2/2003 | Chernoff et al. |
| 2003/0037967 A1 | 2/2003 | Chernoff et al. |
| 2003/0037968 A1 | 2/2003 | Chernoff et al. |
| 2003/0037970 A1 | 2/2003 | Chernoff et al. |
| 2003/0037971 A1 | 2/2003 | Chernoff et al. |
| 2003/0037972 A1 | 2/2003 | Chernoff et al. |
| 2003/0037973 A1 | 2/2003 | Chernoff et al. |
| 2003/0037974 A1 | 2/2003 | Chernoff et al. |
| 2003/0037975 A1 | 2/2003 | Chernoff et al. |
| 2003/0037982 A1 | 2/2003 | Chernoff et al. |
| 2003/0037987 A1 | 2/2003 | Chernoff et al. |
| 2003/0038442 A1 | 2/2003 | Chernoff et al. |
| 2003/0038467 A1 | 2/2003 | Chernoff et al. |
| 2003/0038468 A1 | 2/2003 | Chernoff et al. |
| 2003/0038469 A1 | 2/2003 | Chernoff et al. |
| 2003/0038470 A1 | 2/2003 | Chernoff et al. |
| 2003/0038509 A1 | 2/2003 | Chernoff et al. |
| 2003/0040827 A1 | 2/2003 | Chernoff et al. |
| 2003/0040828 A1 | 2/2003 | Chernoff et al. |
| 2003/0040933 A1 | 2/2003 | Chernoff et al. |
| 2003/0040977 A1 | 2/2003 | Chernoff et al. |
| 2003/0040979 A1 | 2/2003 | Borroni-bird et al. |
| 2003/0046802 A1 | 3/2003 | Chernoff et al. |
| 2003/0047362 A1 | 3/2003 | Chernoff et al. |
| 2003/0089536 A1 | 5/2003 | Chernoff et al. |
| 2003/0094318 A1 | 5/2003 | Chernoff et al. |
| 2003/0094319 A1 | 5/2003 | Chernoff et al. |
| 2003/0094320 A1 | 5/2003 | Chernoff et al. |
| 2003/0116374 A1 | 6/2003 | Chernoff et al. |
| 2003/0141736 A1 | 7/2003 | Chernoff et al. |
| 2003/0159866 A1 | 8/2003 | Claypole et al. |
| 2003/0164255 A1 | 9/2003 | Borroni-bird et al. |
| 2003/0168267 A1 | 9/2003 | Borroni-bird et al. |
| 2003/0168844 A1 | 9/2003 | Borroni-bird et al. |
| 2004/0060750 A1 | 4/2004 | Chernoff et al. |
| 2004/0066025 A1 | 4/2004 | Borroni-bird et al. |
| 2004/0069545 A1 | 4/2004 | Chernoff et al. |
| 2004/0069556 A1 | 4/2004 | Chernoff et al. |
| 2004/0129487 A1 | 7/2004 | Shabana et al. |
| 2004/0163859 A1 | 8/2004 | Chernoff et al. |
| 2004/0163875 A1 | 8/2004 | Chernoff et al. |
| 2004/0164577 A1 | 8/2004 | Shabana et al. |
| 2004/0189054 A1 | 9/2004 | Chernoff et al. |
| 2004/0194280 A1 | 10/2004 | Borroni-bird et al. |
| 2004/0194313 A1 | 10/2004 | Chernoff et al. |
| 2004/0195014 A1 | 10/2004 | Chernoff et al. |
| 2005/0049944 A1 | 3/2005 | Chernoff et al. |
| 2005/0082872 A1 | 4/2005 | Rich et al. |
| 2005/0161981 A1 | 7/2005 | Chernoff et al. |
| 2005/0168016 A1 | 8/2005 | Svartvatn |
| 2005/0263332 A1 | 12/2005 | Chernoff et al. |
| 2006/0027406 A1 | 2/2006 | Borroni-bird et al. |
| 2006/0048994 A1 | 3/2006 | Young et al. |
| 2006/0061080 A1 | 3/2006 | Luttinen et al. |
| 2006/0102398 A1 | 5/2006 | Mizuno |
| 2007/0222251 A1 | 9/2007 | Abraham |

(56) References Cited

U.S. PATENT DOCUMENTS

| | | |
|---|---|---|
| 2008/0169671 A1 | 7/2008 | Hedderly |
| 2009/0058134 A1 | 3/2009 | Hiraishi et al. |
| 2009/0236877 A1 | 9/2009 | Peschansky et al. |
| 2010/0219720 A1 | 9/2010 | Namuduri et al. |
| 2010/0219721 A1 | 9/2010 | Namuduri et al. |
| 2010/0219798 A1 | 9/2010 | Namuduri et al. |
| 2010/0273411 A1 | 10/2010 | Kakizaki et al. |
| 2011/0212355 A1 | 9/2011 | Essinger et al. |
| 2011/0259657 A1 | 10/2011 | Fuechtner |
| 2012/0169089 A1 | 7/2012 | Rawlinson et al. |
| 2012/0175899 A1 | 7/2012 | Gadhiya et al. |
| 2013/0088045 A1 | 4/2013 | Charbonneau et al. |
| 2013/0300138 A1 | 11/2013 | Banasiak et al. |
| 2013/0341882 A1 | 12/2013 | Ehrlich et al. |
| 2014/0308551 A1 | 10/2014 | Schroeder et al. |
| 2014/0353937 A1 | 12/2014 | Girelli Consolaro et al. |
| 2015/0142245 A1 | 5/2015 | Cuddihy et al. |
| 2015/0298741 A1 | 10/2015 | Winberg et al. |
| 2016/0164055 A1 | 6/2016 | Saitou |
| 2016/0318409 A1 | 11/2016 | Rawlinson |
| 2017/0001507 A1 | 1/2017 | Ashraf et al. |
| 2017/0001667 A1 | 1/2017 | Ashraf et al. |
| 2017/0057546 A1 | 3/2017 | Dressel et al. |
| 2017/0225588 A1* | 8/2017 | Newman ............... H02J 7/0027 |
| 2017/0225714 A1 | 8/2017 | Ito |
| 2017/0305248 A1 | 10/2017 | Hara et al. |
| 2017/0369112 A1 | 12/2017 | Ashraf et al. |
| 2018/0050606 A1 | 2/2018 | Sugitate et al. |
| 2018/0065678 A1 | 3/2018 | Tutzer |
| 2018/0072131 A1 | 3/2018 | Lee et al. |
| 2018/0097265 A1* | 4/2018 | Tarlau ............... H01M 10/6567 |
| 2018/0108891 A1 | 4/2018 | Fees et al. |
| 2018/0215245 A1 | 8/2018 | Sudhindra et al. |
| 2018/0229628 A1 | 8/2018 | Minato et al. |
| 2018/0261899 A1 | 9/2018 | Milton et al. |
| 2018/0337378 A1* | 11/2018 | Stephens ............... H01M 50/20 |
| 2018/0361819 A1 | 12/2018 | Ryu et al. |
| 2019/0023321 A1 | 1/2019 | Ayukawa |
| 2019/0092113 A1 | 3/2019 | Girelli Consolaro et al. |
| 2019/0131602 A1 | 5/2019 | Hilfrich et al. |
| 2019/0135065 A1 | 5/2019 | Wolf-Monheim |
| 2019/0210470 A1* | 7/2019 | Thomas ................. B62D 21/10 |
| 2020/0079431 A1 | 3/2020 | Stainer et al. |
| 2020/0156486 A1* | 5/2020 | Howard ................. B60K 11/06 |
| 2020/0339197 A1 | 10/2020 | Kecalevic et al. |
| 2020/0369140 A1 | 11/2020 | McCarron et al. |
| 2020/0398732 A1 | 12/2020 | Glatfelter et al. |
| 2021/0001924 A1 | 1/2021 | Charbonneau et al. |
| 2021/0122223 A1 | 4/2021 | McCarron et al. |

FOREIGN PATENT DOCUMENTS

| | | |
|---|---|---|
| CN | 1695050 A | 11/2005 |
| CN | 1791519 A | 6/2006 |
| CN | 100379612 C | 4/2008 |
| CN | 103183053 B | 6/2016 |
| DE | 10154353 A1 | 5/2002 |
| DE | 10297137 T5 | 8/2004 |
| DE | 10297133.1 B4 | 5/2013 |
| DE | 102018123357 A1 | 3/2019 |
| DE | 102018122854 A1 | 3/2020 |
| DE | 102020101867 A1 | 7/2020 |
| EP | 0770517 A1 | 5/1997 |
| EP | 0857590 A1 | 8/1998 |
| EP | 1245436 A1 | 10/2002 |
| EP | 1446645 A2 | 8/2004 |
| EP | 1448969 A1 | 8/2004 |
| FR | 2821046 A1 | 8/2002 |
| JP | 2005500940 A | 1/2005 |
| JP | 2017001441 A | 1/2017 |
| WO | 03018337 A2 | 3/2003 |
| WO | 03018358 A2 | 3/2003 |
| WO | 03018359 A2 | 3/2003 |
| WO | 03018373 A1 | 3/2003 |
| WO | 03019309 A1 | 3/2003 |
| WO | 03050498 A1 | 6/2003 |
| WO | 03054500 A2 | 7/2003 |
| WO | 2005084985 A1 | 9/2005 |
| WO | 2006029415 A2 | 3/2006 |
| WO | 2015151064 A1 | 10/2015 |
| WO | 2017136351 A2 | 8/2017 |
| WO | WO-2017207125 A1 * | 12/2017 .......... H01M 2/1077 |
| WO | 2020236913 A1 | 11/2020 |

OTHER PUBLICATIONS

International Search Report and Written Opinion for International Application No. PCT/US2020/051879, Search completed Nov. 24, 2020, dated Dec. 14, 2020, 14 Pgs.

International Search Report and Written Opinion for International Application No. PCT/US2020/033769, Completed Jul. 15, 2020, dated Sep. 2, 2020, 30 Pgs.

Invitation to Pay Additional Fees and Partial Search Report Received for International Application PCT/US2020/040788, dated Oct. 2, 2020, 2 Pgs.

International Search Report and Written Opinion for International Patent Application No. PCT/US2020/050013 dated Nov. 30, 2020, 10 pages.

International Search Report and Written Opinion for International Patent Application No. PCT/US2020/051870 dated Feb. 4, 2021, 13 pages.

International Search Report and Written Opinion for International Patent Application No. PCT/US2020/051505 dated Feb. 5, 2021, 12 pages.

Non-Final Office Action for U.S. Appl. No. 17/027,626 dated Jul. 20, 2021, 20 pages.

Notice of Allowance for U.S. Appl. No. 17/142,889 dated Jul. 1, 2021, 7 pages.

Cropley, "Williams reveals electric vehicle skateboard chassis," Autocar Industry News, Haymarket Media Group, Sep. 2017, 5 pages.

Notice of Allowance for U.S. Appl. No. 16/920,375, dated Dec. 17, 2021, 9 pages.

Notice of Allowance for U.S. Appl. No. 17/491,217, dated Nov. 29, 2021, 10 pages.

* cited by examiner

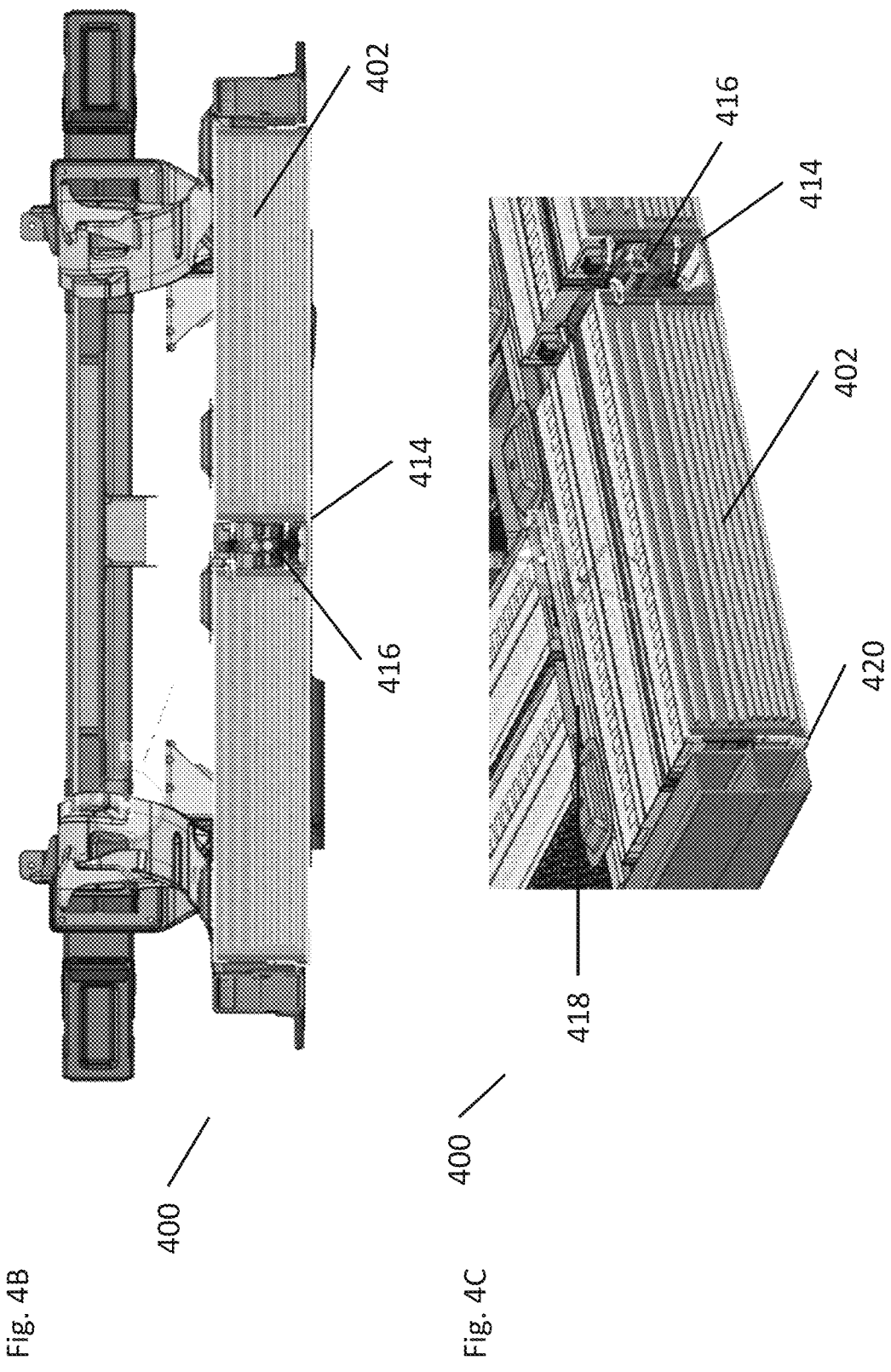

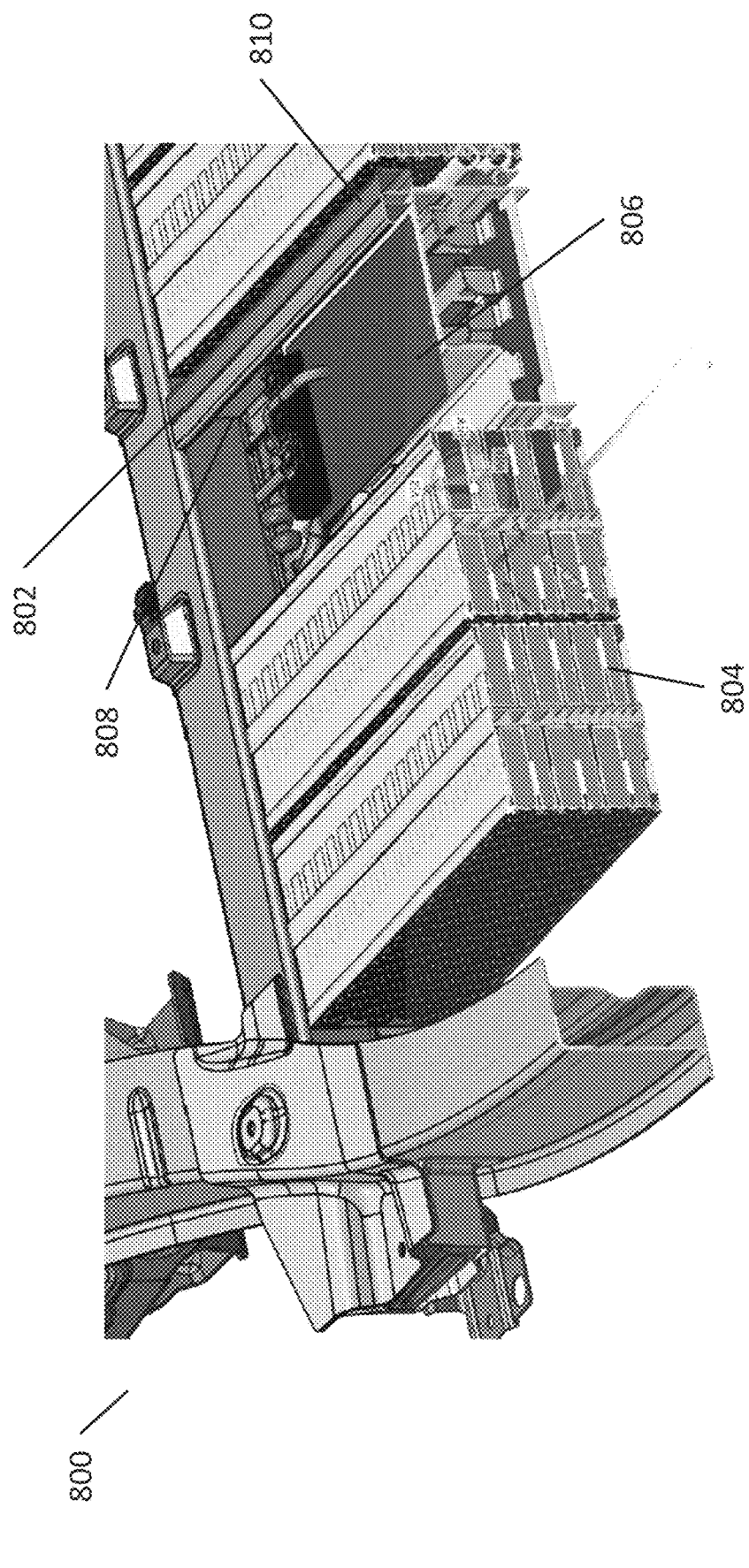

ELECTRIC VEHICLE BATTERY ENCLOSURE

CROSS-REFERENCED APPLICATIONS

This application claims priority to U.S. Provisional application 62/903,709 filed on Sep. 20, 2019. The disclosure of which is included herein by reference in its entirety.

FIELD OF THE INVENTION

The present invention relates generally to battery enclosures for use in electric vehicles. More specifically, it relates to the structures and components that generally make up the enclosure such that the battery for the vehicle is protected from structural damage and prevented from overheating during vehicle operation.

BACKGROUND OF THE INVENTION

Automobile vehicles in general are comprised of many different structural and functional components. In some instances, they may generally be described in relation to a body or cabin, which are designed to enclose the passengers, and the various electrical, mechanical and structural systems, subsystems and components that allow the vehicle to operate. In traditional automobile design, the body and various functional systems and components are inextricably intertwined. For example, mechanical linkages directly interconnect the steering and brake systems between the wheels and the passenger, and elements such as the motor, transmission system, and cooling systems are disposed in a front enclosure that extends upward into the body of the vehicle. Additional structural components may serve to house certain functional elements essential for vehicle operation.

Recent advances in electric motor and battery technologies have made electric vehicles practical to manufacture. Electric vehicles have a number of advantages over conventional internal combustion vehicles, including the dramatically reduced footprint of the drive train components. Further advancements in signal processing and drive-by-wire technologies means that it is now possible to produce vehicle platforms containing all the necessary functional components of a vehicle. Furthermore, with the advancement of electric vehicles, batter enclosures serve a key element in the overall structure and function of the vehicle. However, despite the potential these advancements represent most electric vehicles being produced today continue to incorporate designs that have been traditionally used in internal combustion engines. This can be particularly true for the framework and layout of many of the features including the drive motors. Electric vehicle batteries pose unique problems for the advancement in vehicles which necessarily require unique solutions.

SUMMARY OF THE INVENTION

Many embodiments are directed to a battery enclosure for use in an electric vehicle. Many embodiments include a battery enclosure that has multiple structural elements forming a basic framework of the enclosure including:
A pair of longitudinal side rails each with an elongated body with a forward end and a rear end and with external and internal sides;
A forward and a rear support element each with an elongated body with opposing ends and disposed laterally between each of the side rails and connected to each of the two side rails where each of the opposing ends connects to a respective internal side of the side rails, and wherein the forward support element is disposed at the forward end and the rear support element is disposed at the rear end thereby creating a space therebetween; and
A plurality of lateral support structures having elongated bodies with opposing ends and disposed between the side rails in a longitudinal direction such that the space is divided by the lateral support structures and wherein each of the side rails, forward and rear support elements, and lateral structures serve to provide strength to the battery enclosure as well as act as support features for a plurality of internal battery components disposed within the divided space
A plurality of individual battery modules disposed within the space between the support elements and structures wherein each of the plurality of battery modules are individually connected to one or more support elements.

Other embodiments include one or more longitudinal support members each having an elongated body with a first end and a second end, wherein the first end is connected to a center portion of one of the forward support element or the rear support element and wherein the second end is connected to a center portion of a lateral support structure.

Still other embodiments include a top plate and a bottom plate wherein the top plate is secured to a top portion of each of the side rails, the forward and rear support elements, and each of the plurality of lateral support structures, and wherein the bottom plate is secured to a bottom portion of each of the side rails, the forward and rear support elements, and each of the plurality of lateral support structures.

In yet other embodiments, the battery enclosure has a plurality of temperature control elements, wherein each of the plurality of temperature control elements is disposed between at least two of the plurality of battery modules such that the plurality of temperature control elements receive heat energy from the battery modules.

In still yet other embodiments, the temperature control elements are cooling elements.

In other embodiments, the plurality of temperature control elements are connected to a vehicle temperature control system such that the heat energy received is transferred to the vehicle temperature control system.

In still other embodiments, the plurality of battery modules are disposed parallel to and perpendicular to a longitudinal axis of framework comprised of at least the longitudinal side rails and the front and rear support elements.

In yet other embodiments, the battery enclosure has a plurality of auxiliary components that complement the function of the plurality of battery modules and are interconnected therewith such that the plurality of auxiliary components can transfer energy from the plurality of battery modules to other components in a vehicle structure.

In still yet other embodiments, the auxiliary components are connected to the plurality of battery modules via wire buses.

In other embodiments, wherein the plurality of auxiliary components are selected from a group consisting of power management devices, cooling elements, and battery disconnects.

In still other embodiments, each of the plurality of lateral support structures have at least one opening disposed within the elongated body such that the opening extends between two external sides of the elongated body such that the wire busses pass can through the at least one opening to connect the plurality of battery modules and auxiliary components.

In yet other embodiments, the bottom plate comprises a sacrificial impact layer such that an impact to the bottom plate does not damage the bottom plate beyond the sacrificial impact layer.

In still yet other embodiments, the bottom plate comprises a plurality of support ridges such that each of the ridges extend inward towards the space and are configured to engage with and support each of the plurality of individual battery modules.

In other embodiments, the top plate has a plurality of connection points disposed on an outer surface.

In still other embodiments, the battery enclosure has a plurality of battery support elements connected to at least one of the longitudinal side rails and/or at least one of the plurality of lateral support structures and wherein each of the plurality of battery support elements has a flange extending inward towards the space and cooperatively engages with at least one of the plurality of battery modules.

In yet other embodiments, each of the battery modules can be individually removed and/or replaced as needed.

Other embodiments include an electric vehicle platform with a battery enclosure in accordance with the embodiments described herein.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

DESCRIPTION OF THE DRAWINGS

The description will be more fully understood with reference to the following figures, which are presented as exemplary embodiments of the invention and should not be construed as a complete recitation of the scope of the invention, wherein:

FIGS. 4A to 4C illustrate cross sections of a battery enclosure in accordance with embodiments.

FIG. 8 illustrates an additional battery enclosure in accordance with embodiments of the invention.

DETAILED DESCRIPTION OF THE INVENTION

Figure 1:
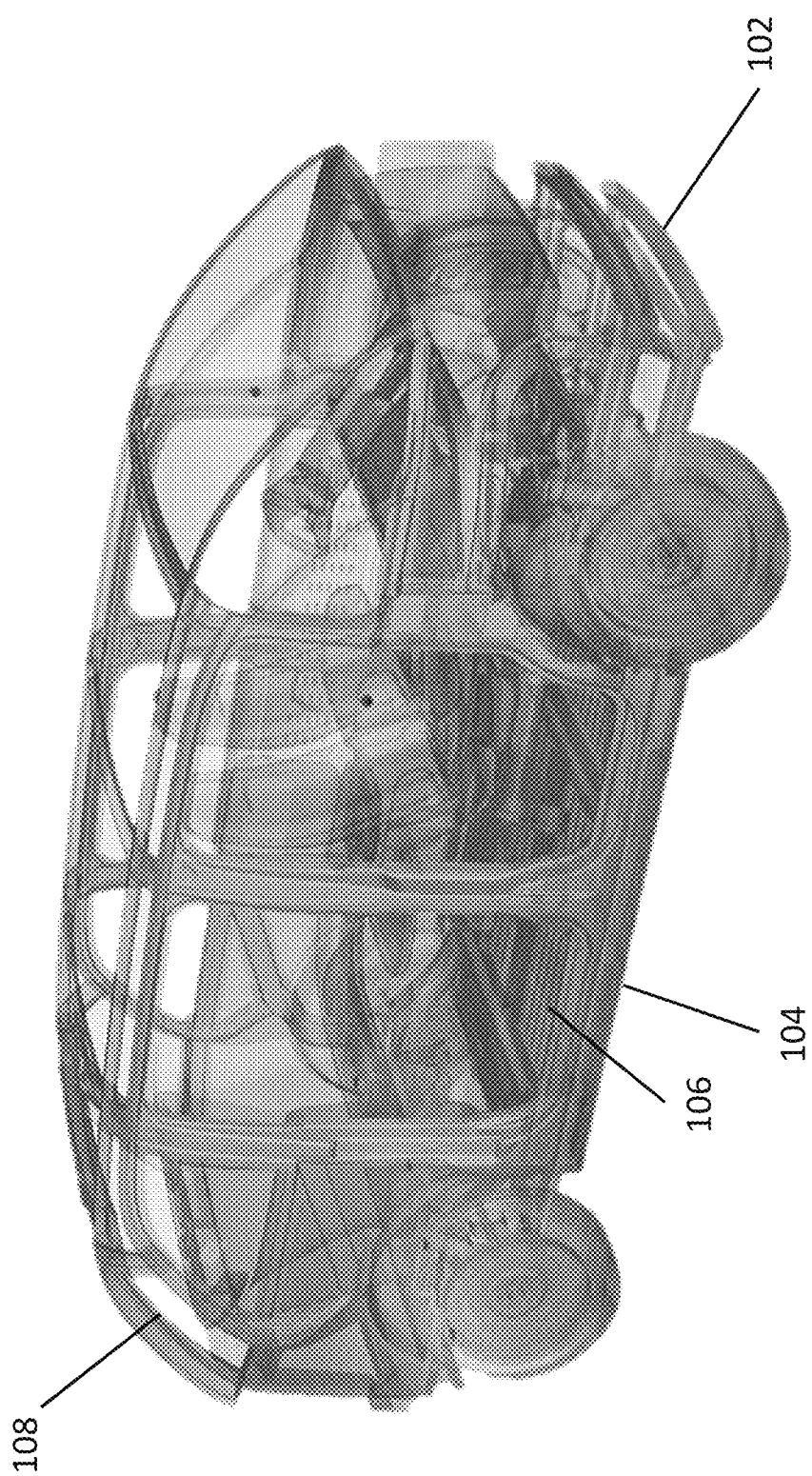
FIG. 1 illustrates a vehicle in accordance with embodiments.

Many embodiments include a battery enclosure of an electric vehicle that is made up of a plurality of structural components including side rails and a number of end rails that are interconnected such that they form an enclosure for which to store multiple electric vehicle battery modules that may make up the power source of an electric vehicle. In numerous embodiments, the battery enclosure makes up a portion of the electric vehicle framework and provides structural support to both the electric vehicle and the various components of a skateboard structure as well as support mechanisms for the individual modular battery modules within the structure. Additionally, many embodiments may include protection elements to prevent or minimize intrusion into the battery modules located within the battery enclosure.

The development of electric vehicles brings with it new challenges, including the storage and protection of the power source which serves to provide power to the propulsion system of the electric vehicle. Typically, electric vehicle manufactures design a frame work for the vehicle to support all of the functional elements of the vehicle. Many such frameworks are designed to support the propulsion system as well as the mechanical and electrical linkages between the propulsion system and other components and systems of the vehicle. Included within the framework of many vehicles is a location for which to store a battery that is typically used to provide the main power to the various components of the vehicle including the propulsion system. With a variety of vehicles currently on the market the designs can vary greatly. However, many vehicle designs tend to incorporate the battery storage area in the bottom of the vehicle due to the weight of the battery, thus, keeping the center of gravity as low as possible. Additionally, what has become a more traditional form of battery in electric vehicles is a monolithic pre-sealed battery which is inserted into an interior space within the framework of the vehicle. The pre-sealed battery ads a layer of protection around the battery to prevent leakage or damage. Accordingly, many electric vehicle manufactures rely upon traditional framework manufacturing methods to make the frames for the respective vehicles.

In contrast, many embodiments of the present invention include a framework structure that provides a battery enclosure that acts with dual functionality. For example, numerous embodiments of a battery enclosure provide additional structural elements that act to strengthen the overall framework of the vehicle as well as support other functional components of the vehicle. In part, this also allows for a more modular design with respect to the battery compartment. Having multiple sections of the overall battery compartment can allow for the use of numerous individual battery modules to be housed within the compartment. The modularity can be advantageous in that maintenance costs can be reduced by not requiring the entire power supply or monolithic pre-sealed battery to be replaced, but rather individual modules can be replaced and/or repaired as needed. Additionally, maintaining a sealed enclosure or one that is protected from the outside environment is important to electric vehicle power sources. Accordingly, some embodiments may incorporate top and bottom plates that can ultimately act to seal the entire battery compartment as well as provide additional protection for outside intrusion or exposure.

Figure 2:
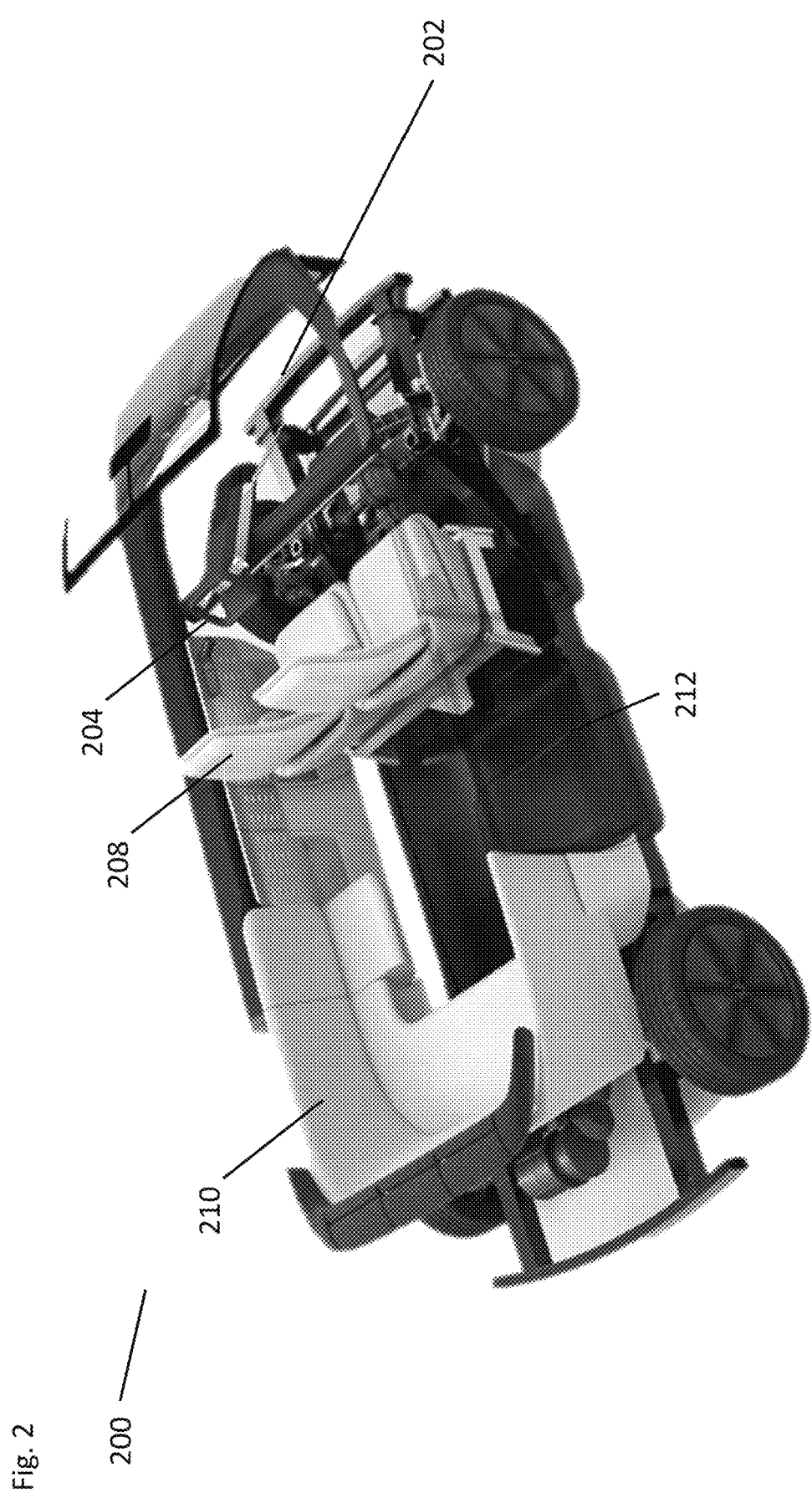
FIG. 2 illustrates an electric vehicle platform having an embodiment of components of a vehicle cabin integrated therewith in accordance with embodiments.

Turning now to the figures, many embodiments of an electric vehicle framework are designed to not only house the battery or provide a battery enclosure but also to provide a support structure for which other components could be attached. For example, FIG. 1 illustrates an embodiment of an electric vehicle with various components positioned on a general framework 102 of the vehicle. Many embodiments include a battery enclosure 104 that may be positioned in or near the center of the vehicle which is designed to house battery components 106. The positioning can help to stabilize the vehicle by ultimately lowering the center of gravity. Many embodiments of an electric vehicle framework can also provide attachment points for an upper portion or top hat of the vehicle 108 that may have its own separate frame structure to support the overall body of the vehicle. FIG. 2 presents an open view of an upper body or top hat structure 200 positioned on an electric vehicle framework 202 with various other components of a vehicle attached thereto. For example, many embodiments incorporate a steering system 204 connected to the framework of the top hat as well as may be electronically connected to a drive system (tires and motors) that are supported by the frame work 202. Other embodiments may incorporate seating elements (208 & 210) that may be attached directly to the framework 202 or may be directly attached to the top of the battery enclosure 212. Many embodiments of a battery enclosure may also provide additional support features to allow for any number of configurations of seating (208 & 210) and/or steering systems 204.

Figure 3A:
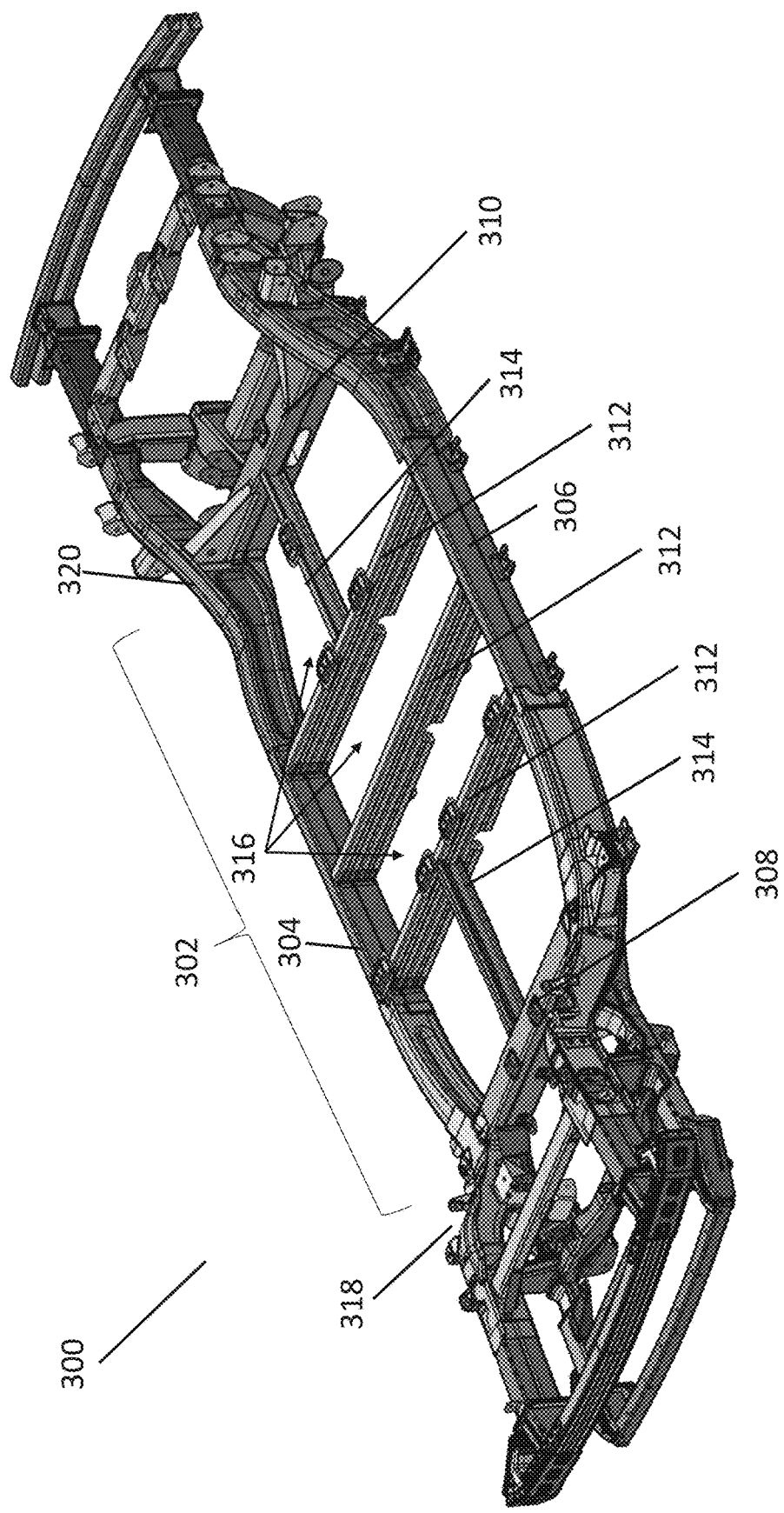
FIGS. 3A to 3C illustrate a battery enclosure for an electric vehicle platform in accordance with embodiments
Figure 3B:
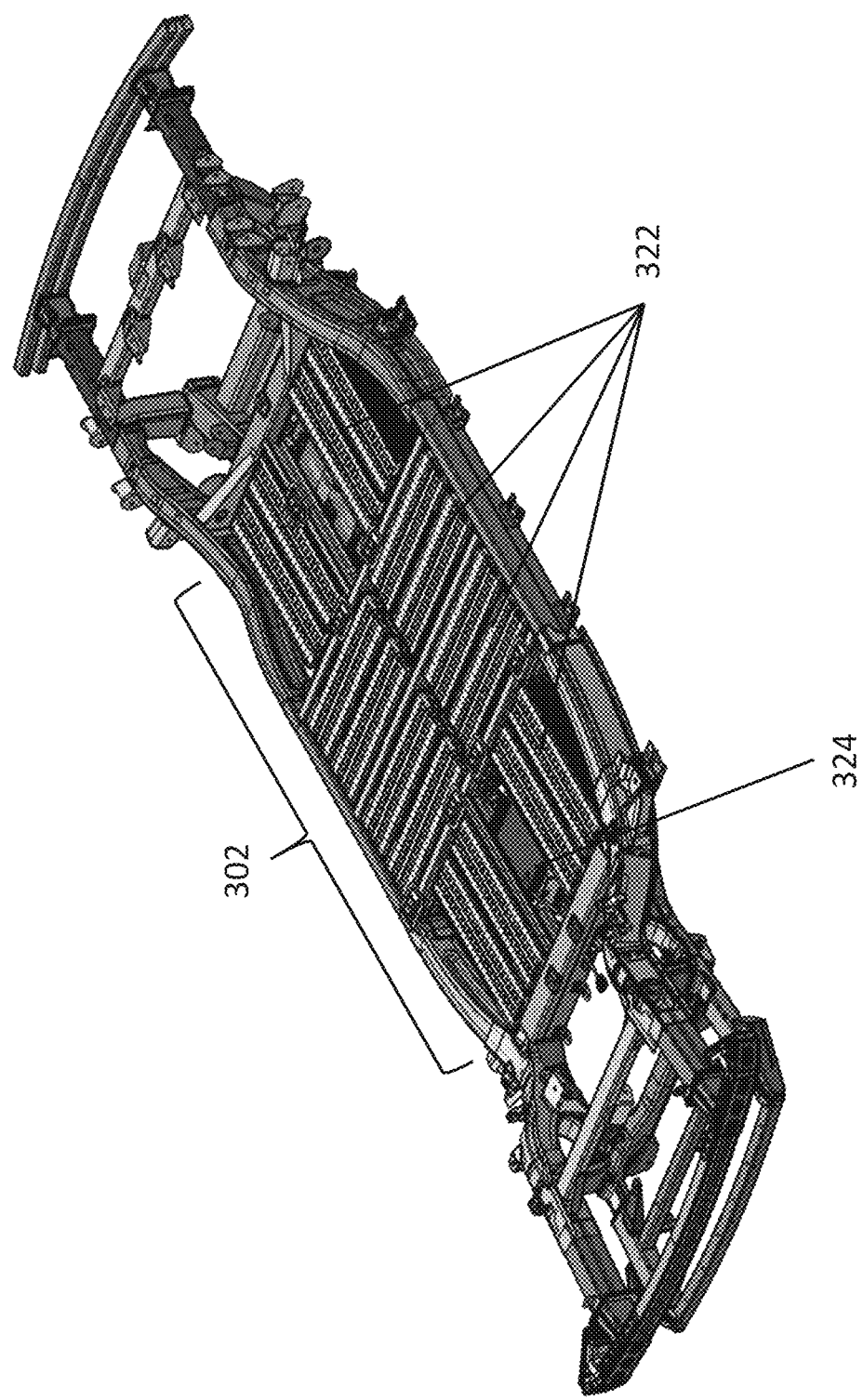

One of the reasons conventional electric vehicles utilize an energy storage system disposed within a rigid vessel is to provide additional structural stability to the vehicle platform frame, which would otherwise have a large open middle section. As previously discussed, numerous embodiments of a vehicle frame work 300 may incorporate the battery enclosure 302 within the open mid-section of the vehicle framework 300. For example, FIGS. 3A 3B illustrate embodiments of a vehicle framework 300 with a forward end and a rear end. The center section represents what may be considered a battery enclosure 302. In accordance with many embodiments, the vehicle framework 300 utilizes various elements such as side rails (304 & 306) as well as forward and rear cross members (308 & 310) to make up the exterior walls or framework of the battery enclosure 302. Embodiments address the loss of such a rigid vessel body by integrating into the vehicle framework 300 a variety of additional elements, which subdivide the interior space of the mid-body 302 of the vehicle platform into a number of separated interior spaces. In many embodiments the battery enclosure may contain additional cross members 312 that transverse the width of the framework. Such cross members can act in two fold to add additional strength (twisting, bending, and impact) to the framework of the vehicle and provide additional structural support for the batter modules (not shown). In many embodiments the cross members may also serve to provide structural support and connection points for additional elements within the body of the vehicle, such as seating elements and/or upper body components. In various embodiments, the battery enclosure 302 may also have longitudinal support members 314 that may be connected between the forward and rear cross members and a transverse cross member 312 of the battery enclosure 302.

Figure 3C:
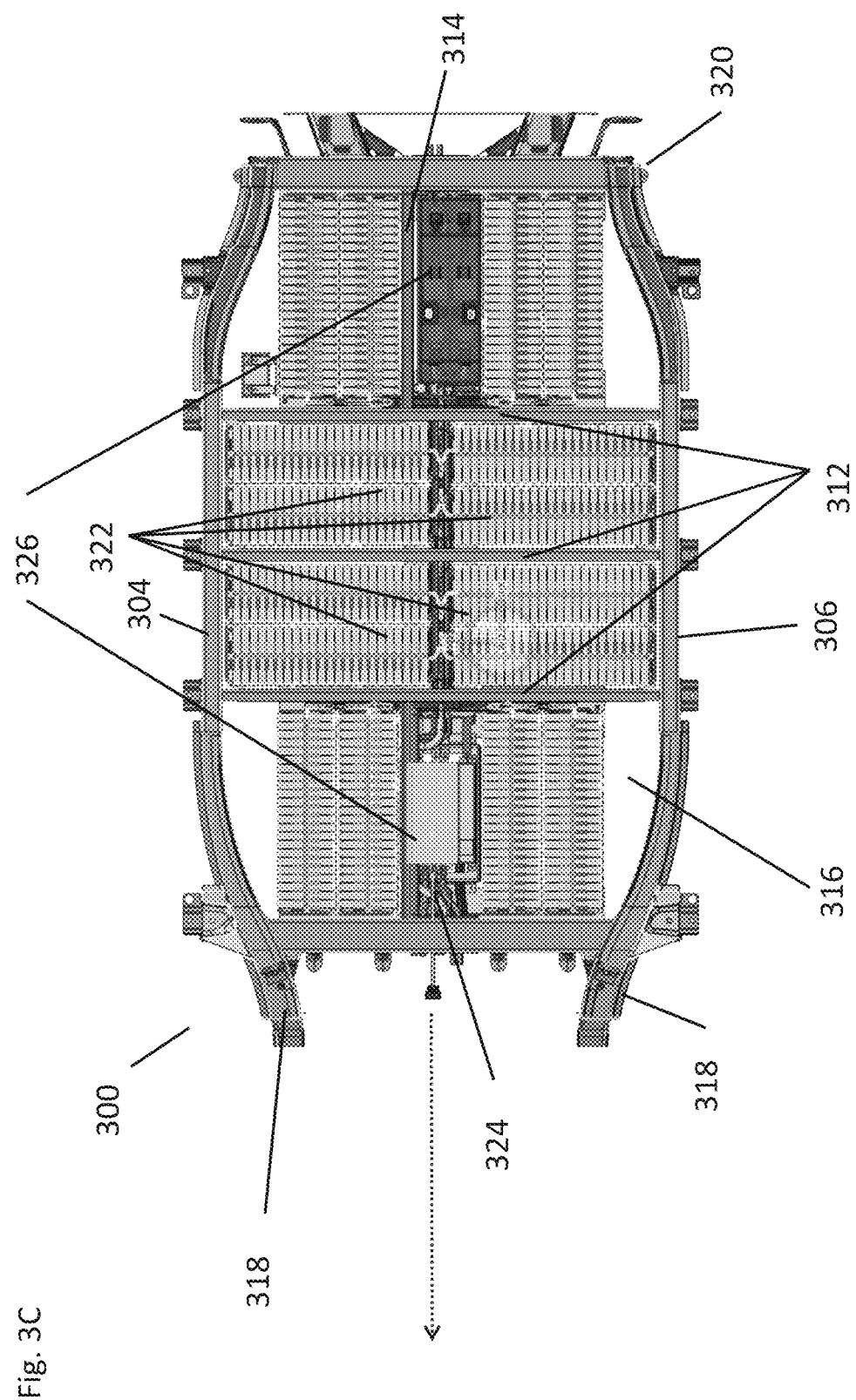

Similar to the transverse cross members 312, the longitudinal support members 314 may serve to add structural support to the framework 300 as well as the battery modules 322, illustrated in FIG. 3C. Accordingly, the structural elements of the battery enclosure 302 may have one or more spaces 316 that can serve as areas to place battery modules, as can be further illustrated in FIG. 3B and 3C. Additionally, in many embodiments the longitudinal and traverse cross members (314 and 312) may be configured with one or more openings that traverse the width of the various cross members. The openings, in many embodiments may be used run interconnection components between the various battery modules and/or auxiliary elements as illustrated in various sections of this specification. Although certain configurations of structural elements are shown, it should be understood that any number and arrangement of such structural members might be implemented such that sufficient frame stability is created. In addition to conferring additional stability to the vehicle platform, such interior structural members also provide support elements for one or more of the battery modules 322, illustrated in FIG. 3B and 32, and/or support components (324, and 326) disposed within the frame battery compartment, and for vehicle body elements mounted to the vehicle platform.

Since the battery enclosure may serve as a multi-function component of the overall vehicle, many embodiments may incorporate unique features and elements within the battery enclosure framework to improve the overall function of the framework and electric vehicle. For example, many embodiments of the side rails 304 may have additional forward 318 and rear 320 frame rails. The frame rails (318 & 320) may serve as additional support elements for the vehicle components but in many embodiments, they may also serve as extensions of the side rails that make up the sides of the battery enclosure 302. Additionally, some embodiments may incorporate impact control elements to help prevent potential penetration into the energy storage compartment.

Energy storage systems that have modular battery components may in be designed with various structural and functional features to aid in the simplicity of design and use, and overall adaptability of the electric vehicle platform. For example, some embodiments many be adaptable to different power requirements that may require more or less battery modules. Thus, modularity of components can be beneficial in the overall function of the vehicle platform. In various embodiments, as shown in FIG. 3C, the vehicle framework 300 incorporates an electric vehicle battery system or energy storage system comprised of a number of separate modular vehicle battery elements 322 interconnected together and with the other elements of the vehicle platform through a suitable configuration of wires and/or buses 324, and battery support systems 326 (e.g., cooling, battery disconnects, and power management components). These modular vehicle battery elements 322 are disposed within the mid-body space 316 of the vehicle platform frame (304, 306, 318, and 320) such that the structural elements of the frame (304, 306, 318, and 320) and top and bottom (502/504 in FIG. 5A) cover plates of the vehicle frame combine to directly form the sealed battery containment vessel for the vehicle battery elements. By using elements of the frame (304, 306, 318, and 320) as the containment vessel for the energy storage system, in accordance with embodiments, substantial weight savings can be realized.

FIG. 3C further illustrates an embodiment of a battery enclosure where individual battery modules 322 are disposed within the form factor of a battery enclosure 302 and further supported by multi-functional members such as the transverse cross members 312 as well as the longitudinal cross members 314. In some embodiments, the transverse 312 and longitudinal 314 support elements can also function as cooling mechanisms to help cool the battery modules 322 and improve the efficiency of the vehicle. This can be done by maintaining a temperature differential between the support element and the batter module 322. In accordance with some embodiments, the longitudinal 314 and transverse 312 members may serve to support the auxiliary elements 326 and/or electric busses and wires 324 that are housed within the battery compartment. As previously described the battery compartment 302 can be configured with various passages that allow for the connection between the various battery modules 322 and a number of other components such as the drive systems (not shown).

Figure 4A:
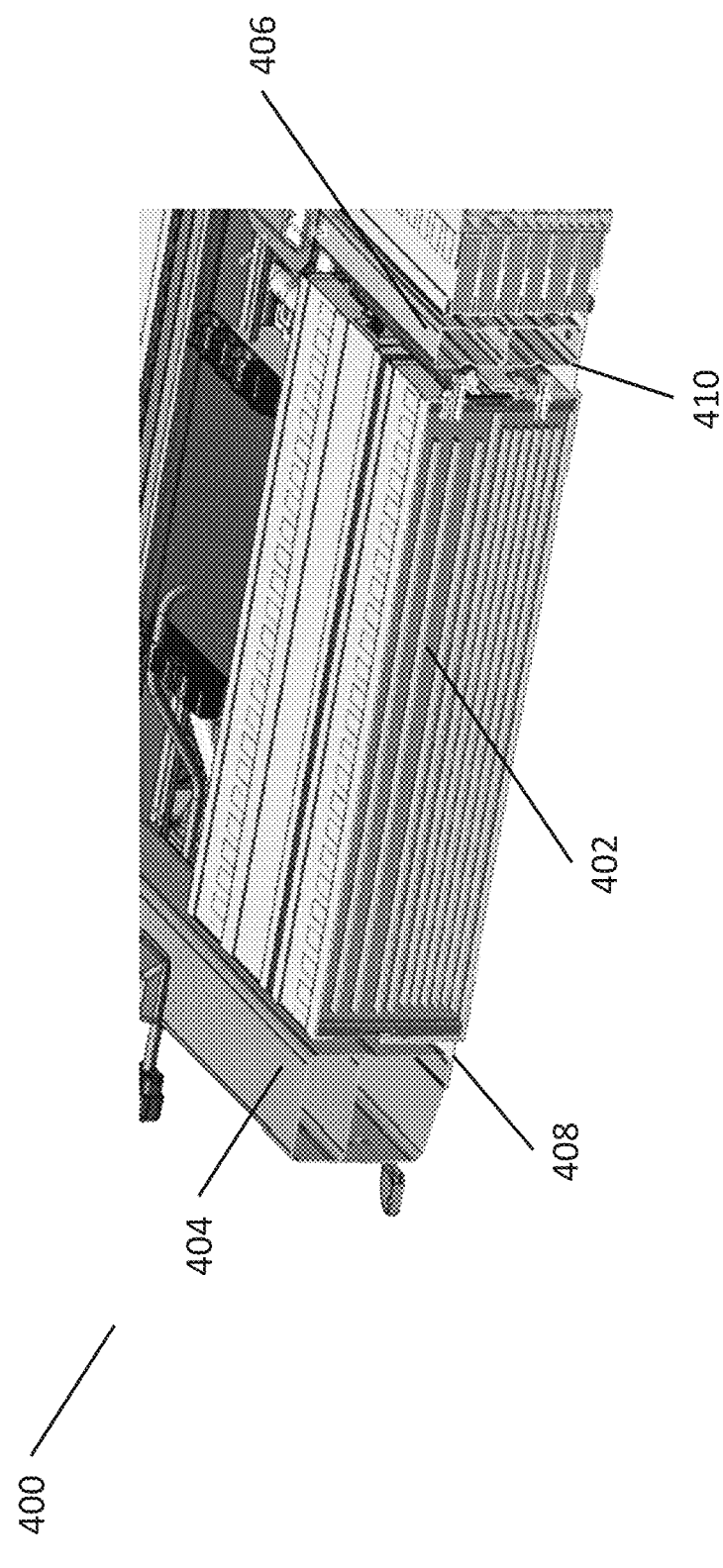

As previously discussed, numerous embodiments may have one or more spaces to hold the various battery modules within the battery enclosure. Accordingly, FIGS. 4A through 4C illustrate various embodiments of a battery enclosure 400 with additional structural elements to help support the battery module 402. For example, FIG. 4A illustrates a cross sectional view an embodiment of a portion of a battery enclosure with a battery module 402 positioned longitudinally between a portion of the frame work 404 and a transverse support element 406. In some embodiments, the battery module 402 may be connected to the framework 404 by an end bracket 408 where the end bracket(s) 408 may be connected to a bottom surface of the frame work. Various embodiments may use one or more transverse brackets 410. Similar to the end brackets 704, the transverse brackets 410 may be positioned on the upper or bottom portion of the battery module. However, as can be appreciated the transverse brackets 410 would be connected to the transverse support elements 406. The transverse brackets 410, in accordance with some embodiments, may be designed to interconnect individual battery modules 402 while simultaneously connecting the both adjacent battery modules to the framework of the enclosure via the transverse support member 406. In accordance with many embodiments many battery modules may be positioned within the battery enclosure 400 such that the length of each module may run perpendicular or parallel to the adjacent module.

Turning now to FIGS. 4B and 4C, embodiments of a battery enclosure 400 with portions thereof housing battery module 402 that run perpendicular to the enclosure are illustrated. For example, FIG. 4B illustrates a front cross sectional view of the transverse portion of the battery enclosure. In many embodiments, the battery modules 402 may be further supported by central or longitudinal brackets 414. The longitudinal brackets 414 can take on any number of forms but may be designed to serve multiple functions. For example, as illustrated in FIGS. 4B and 4C, the longitudinal bracket 414 is designed to support two adjacent battery modules 402 as well as provide a channel 416 to run additional electrical components that may be used to interconnect battery modules 402 or connect battery modules 402 with other vehicle components such as drive systems. The longitudinal bracket 414 may be designed with one or more flanges at the ends (not shown) to allow the longitudinal bracket 414 to attach to one or more cross members 418. In some embodiments, the longitudinal support members 414 may have cross sections that are "C" shaped such that a channel is formed centrally along the length of the support 414. In some embodiments, the support members 414 may have additional ridges, protrusions or flanges formed in a portion of the support member. Accordingly, the ridges, protrusions, or flanges may be designed to passively engage a battery module 402 and/or an auxiliary component. In some embodiments the ridge, protrusion or flange may have a hollow cross section for weight savings while other embodiments may be solid cross sections. Although specific designs of the various elements are illustrated, it should be understood that any number of designs may be used in accordance with embodiments of the invention.

Additionally, some embodiments of a battery compartment 400 may use one or more peripheral brackets 420 that may be positioned on the upper or bottom portion of the battery module 402 and connect the battery module 402 to a side rail of the frame work. In accordance with many embodiments, the brackets (408, 410, 414, & 420) may have one or more fenestrations to allow for mounting of the battery components 402 or fastening to the respective portions of the framework or for allowing other interconnective elements to pass throughout the battery enclosure 400.

Figure 5A:
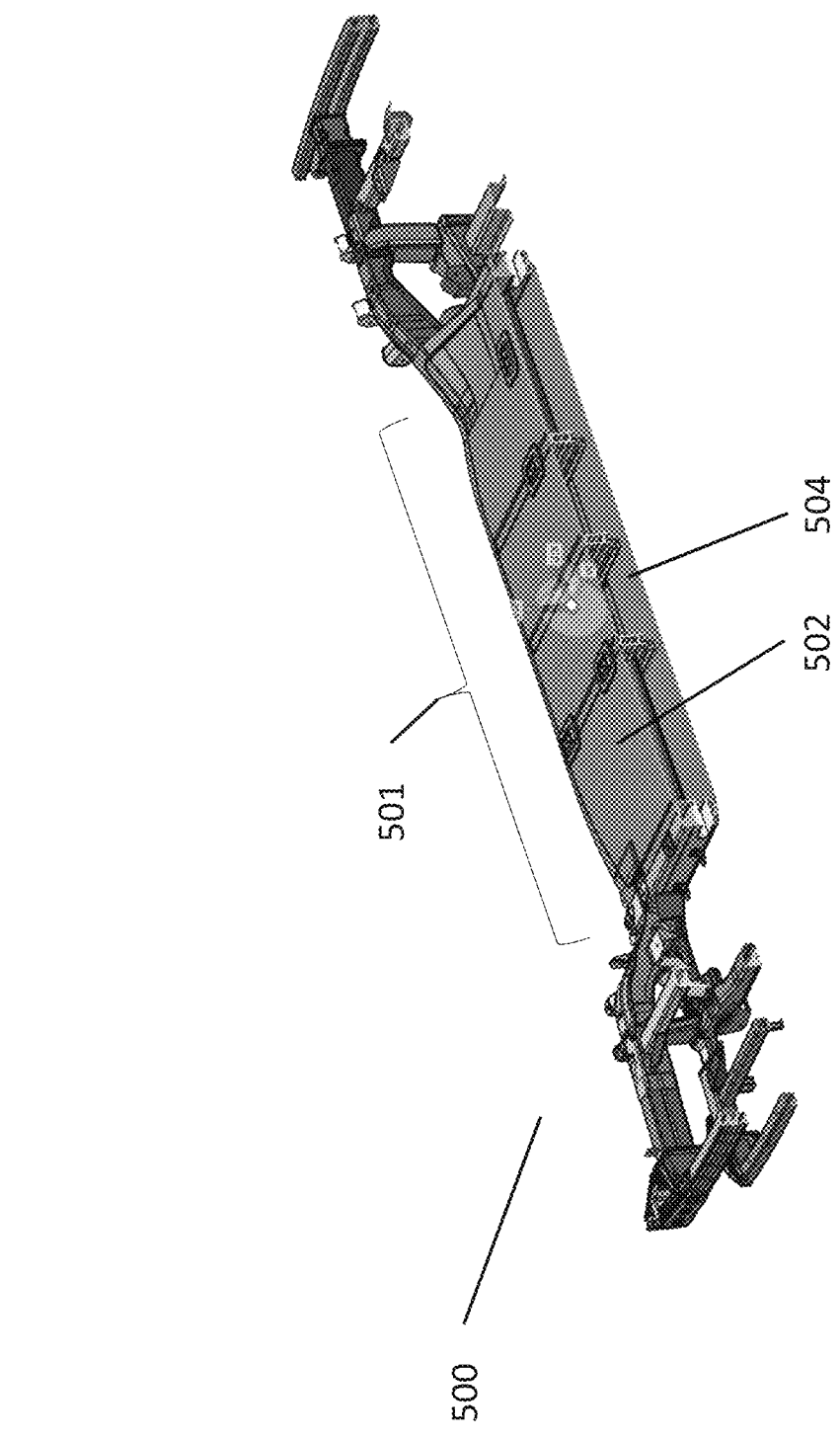
FIGS. 5A to 5C illustrate a cross sectional view of a battery enclosure with top and bottom plates in accordance with embodiments.
Figure 5B:
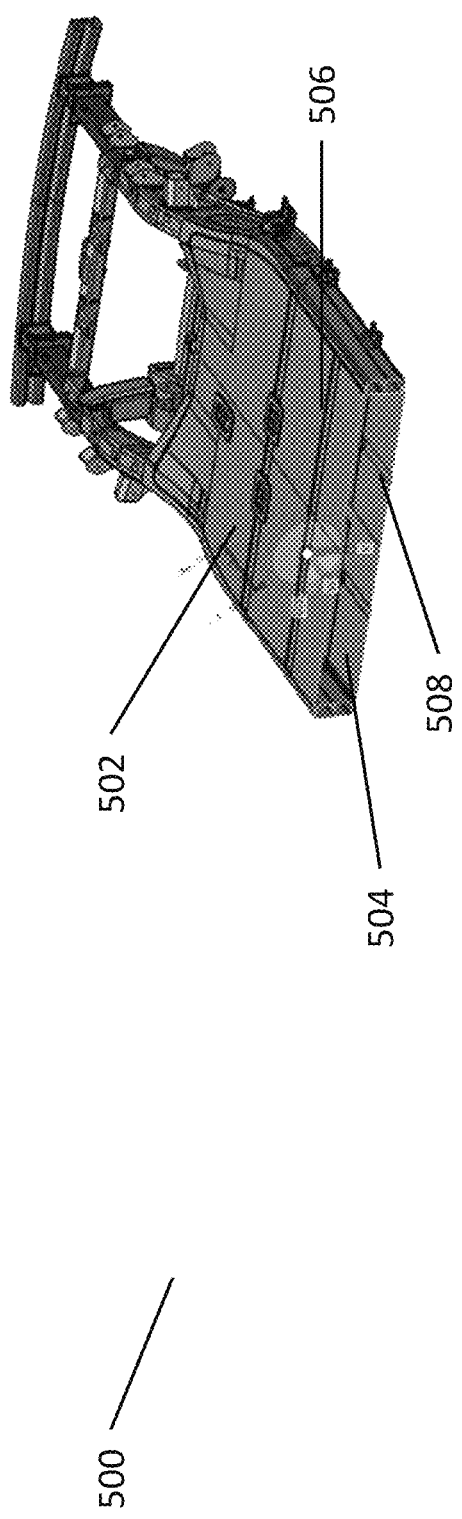
Figure 5C:
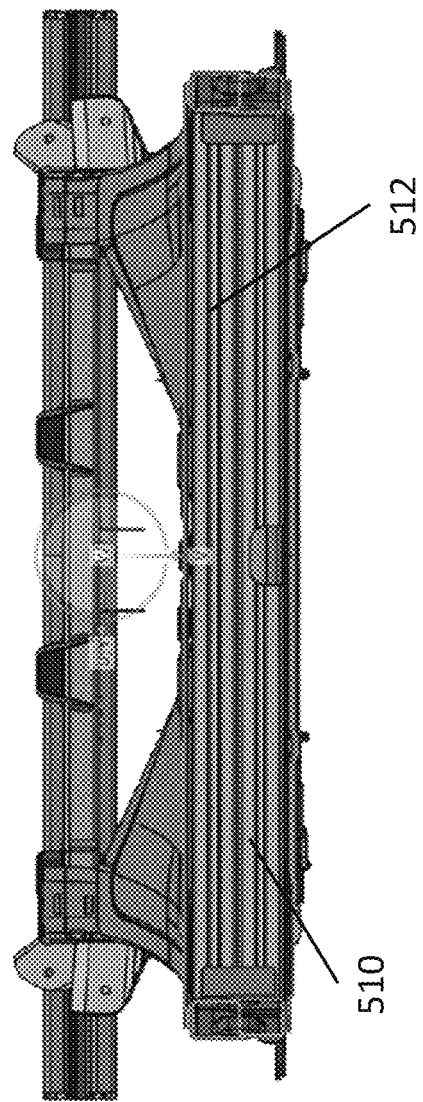
Figure 6:
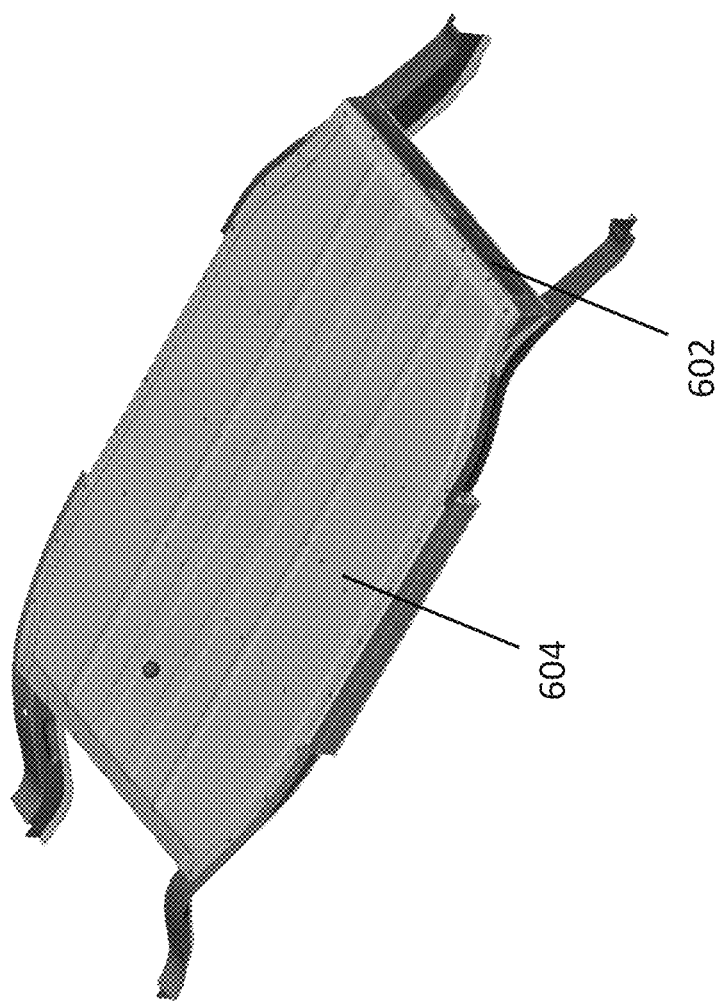
FIG. 6 illustrates a prospective view of a bottom portion of a battery enclosure in accordance with embodiments of the invention.

As has been discussed throughout, the battery enclosure, battery compartment, or energy storage system may have a variety of components that can serve multiple functions such as structural support and/or protection. For example, FIGS. 5A-6 illustrate embodiments of a battery enclosure system with additional multi-functional elements. FIG. 5A, for example, illustrates a cross sectional view of an embodiment of a vehicle framework 500 with a battery enclosure 501 that also includes a top 502 and bottom 504 plate. The top 502 and bottom 504 plates can act in part to seal off the battery compartment from the external environment and act to prevent unwanted intrusion and/or escape. Other embodiments of a battery enclosure 501 with top 502 and bottom 504 plates can have additional features that serve other functions beyond sealing the battery compartment. For example FIG. 5B illustrates a cross sectional view of a battery compartment where the top and bottom plates (502 & 504) may be configured with protrusions or grooves (506 & 508) that run transverse to the enclosure (506) and/or longitudinal to the enclosure (508). Such protrusions may be configured to aid in securing one or more additional elements to help support the battery module (not shown) within the battery enclosure 500. For example, some embodiments may incorporate brackets or additional structural components that can be secured to the top 502 and/or bottom 504 plates. The additional structural components can serve as a device to help keep the battery module(s) from moving around during vehicle movement that can also help to improve the efficacy of the battery enclosure in preventing damage to the enclosed battery modules. Additionally, some of the cross members, as discussed earlier, may also incorporate ridges, grooves, protrusions, or the like that may be designed to engage with or cooperate with the battery cells to prevent movement and/or damage. For example, FIG. 5C illustrates transverse cross members 510 may have one or more longitudinal ridges 512 the run the length of the member. The ridges 512 may be on the upper, middle or lower portion of the cross member 510 and may be configured such that it matches an opposing portion of a battery cell to therefore provide support and/or protection.

Referring to FIG. 6, various embodiments may use alternate forms of a bottom cover plate 602 similar to that illustrated in FIGS. 5A and 5B to protect the energy storage compartment from objects below the vehicle platform. Some embodiments may incorporate additional safety measures and/or devices to prevent unwanted intrusion into the battery storage compartment. For example, the conventional approach might be to install a bottom cover plate that is sufficiently thick to absorb the energy of an impact completely, however, this solution results in high mass penalties. Accordingly, many embodiments employ a sacrificial shear panel/layer 604 attached under the energy storage system compartment that is configured to shear off when the bottom cover plate 602 is impacted.

Although many embodiments are described with respect to a battery compartment within the context of an electric vehicle platform, it will be recognized that the vehicle platform frame can take many different forms. Accordingly, many embodiments of battery compartments and/or energy storage system may take on any number of configurations. Moreover, the various structural and functional components of such systems may be included or omitted in any number of designs of electric vehicle platforms and/or battery compartment/energy storage systems.

The modularity of the vehicle battery elements in accordance with embodiments confers other advantages over conventional monolithic batteries. Implementations of such modular batteries allows for facile adjustment to their configuration during either manufacture or maintenance. Specifically, the modularity allows energy storage to be adjusted depending on the size and quantity of electric storage required for the function of the vehicle. For example, various embodiments may allow for the creation of different-range versions of vehicles simply by varying the number of battery modules inserted into the energy storage system. Other embodiments may allow additional battery modules to be used with larger top-hat configurations that may require additional energy for adequate functionality. Additionally, the modularity of the energy storage system in many embodiments, allows the ability to replace individual elements that may fail without the need to remove the entire energy storage system thereby reducing the cost of battery replacement throughout the life of the vehicle.

Figure 7A:
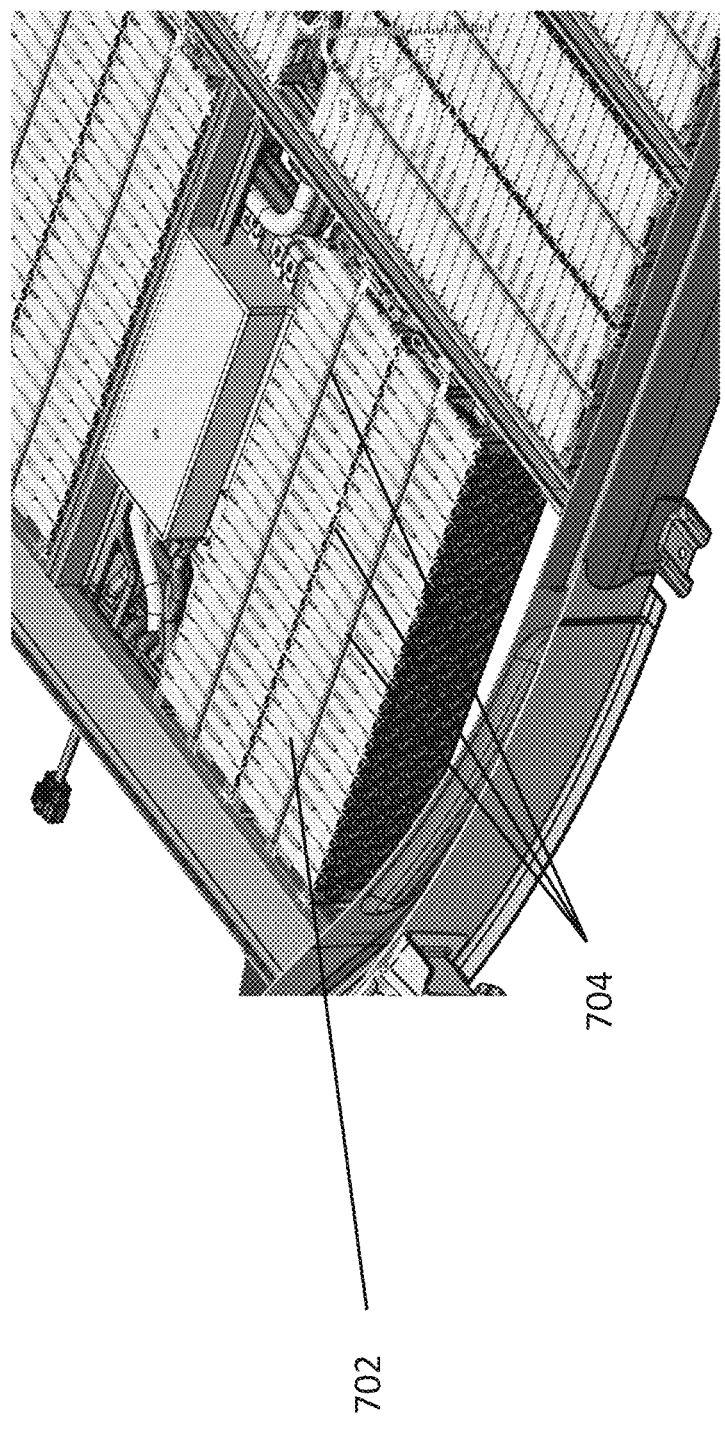
FIGS. 7A to 7C illustrate individual battery modules within a battery enclosure in accordance with embodiments of the invention.
Figure 7B:
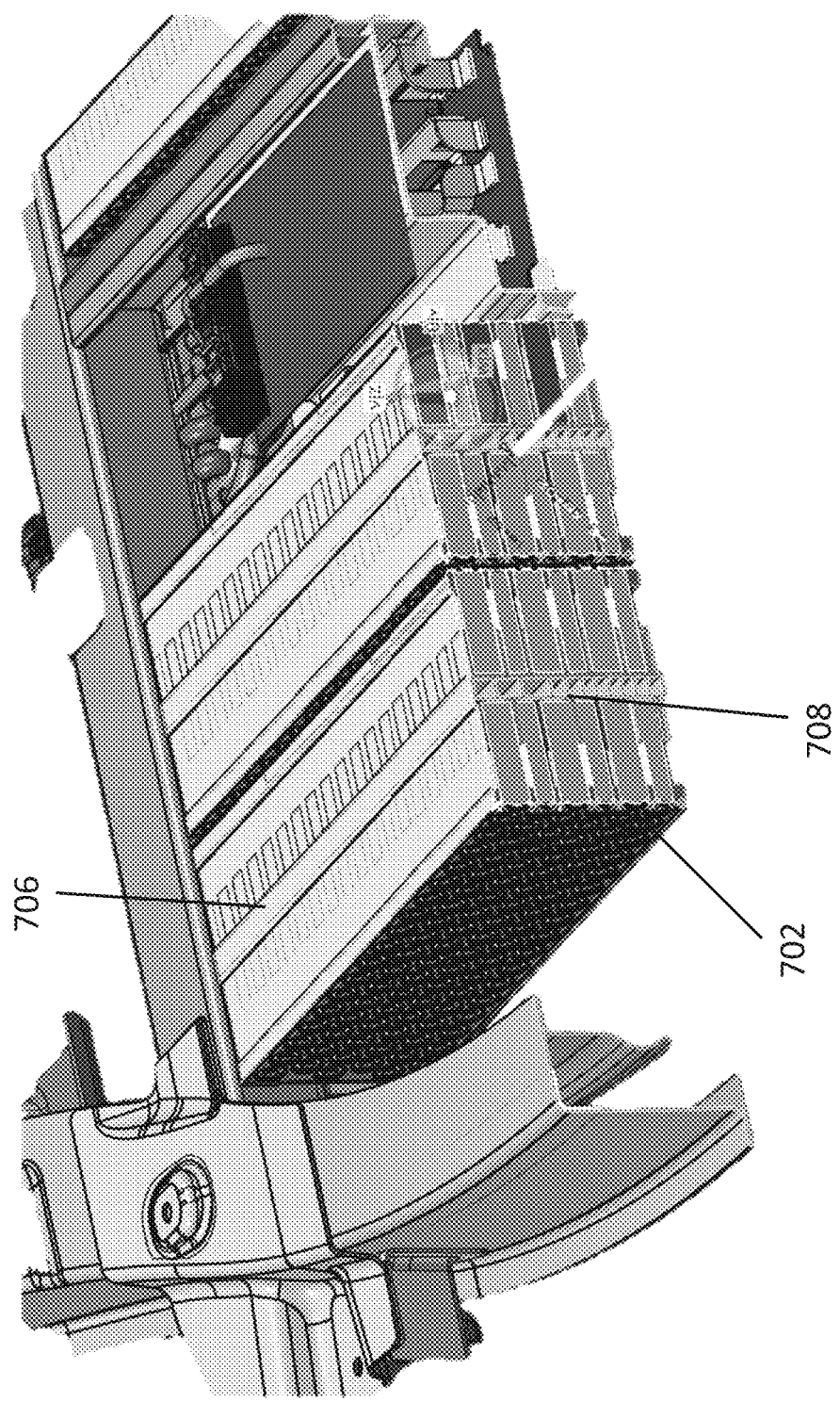

Another advantage of the battery modularity implemented according to embodiments is the ability to orient the individual modular battery components as desired. Accordingly, many embodiments can allow for the improved battery efficiency as well as improved or more efficient packaging of the battery modules within the vehicle platform. As shown in FIGS. 7A and 7B, battery modules 702, according to many embodiments, can be packaged with one or more integrated cooling elements 704. Additionally, such cooling elements 704 can be used to transfer heat energy to other elements of the vehicle for use such as a HVAC system for occupant temperature maintenance. While the primary function of the embodiments of the cooling elements is to maintain the temperature of the batteries and serve as a heat transfer tool to transfer and reuse the heat from the battery elements to other systems of the vehicle, in various embodiments of the of a battery compartment the cooling elements 704 may serve as a secondary structural component.

Specifically, according to many embodiments, cooling elements 704 comprise elongated rigid bodies 706 having a variety of channels and heat plates 708 disposed therein that may be used to aid in cooling and/or running other heat transfer elements. These heat transfer elements and battery support plates are extremely rigid and typically made from a metal to encourage heat transfer.

Figure 7C:
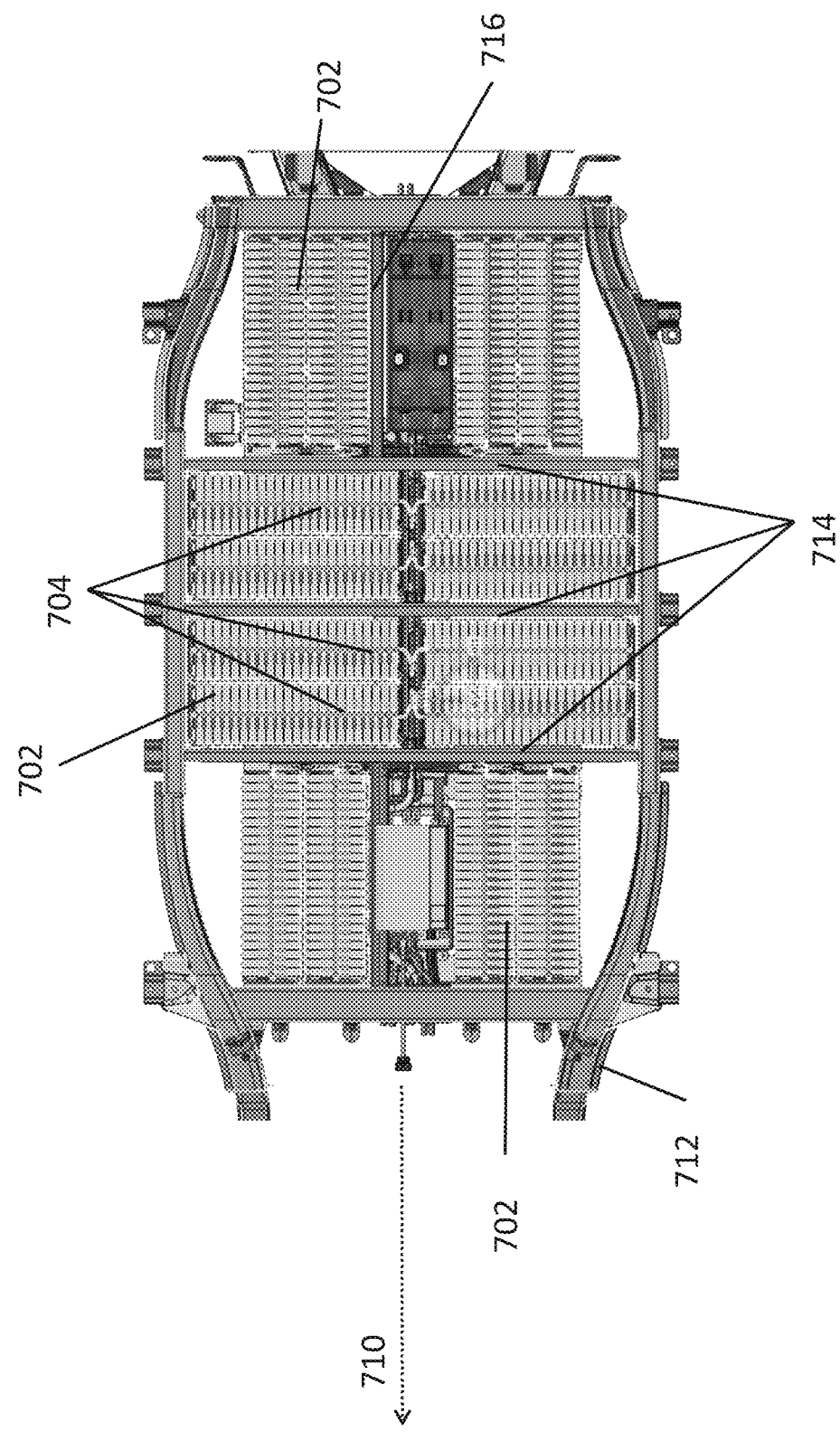

Accordingly, in various embodiments, as shown for example in FIG. 7C, battery modules 702 may be oriented in a varying geometry such that these rigid cooling elements 704 may serve as secondary structural elements. Specifically, as shown in FIG. 7C battery modules 702 in the front and rear of the energy storage system are disposed geometrically parallel to a longitudinal axis 710 of the vehicle such that they serve as structural elements against deformation of the frame 712 into the energy storage system from potential front or rear impacts. In contrast, battery modules 702 disposed within the central portion of the energy storage system are disposed geometrically transverse to the longitudinal axis 710 of the vehicle thus allowing the battery modules to serve as a further lateral structural support for the vehicle platform frame in the case of side impacts. In some embodiments, sufficient additional stability may be provided by arranging such battery modules to allow for the removal of the interior structural frame elements 714/716 thus further reducing vehicle weight and increasing the number of battery modules that can be positioned within the vehicle platform frame.

Turning now to FIG. 8, embodiments of a battery enclosure 800 are further illustrated. As has been thoroughly described, many embodiments may incorporate longitudinal support members 802 that may provide structural support to the overall framework of a vehicle and/or support for the battery enclosure 800. Additionally, many embodiments may have longitudinal support members 802 that are designed to support battery cells 804 or auxiliary electrical components 806. Accordingly the longitudinal support members may have cross sections that are "C" shaped such that a channel 808 is formed centrally along the length of the support 802. In some embodiments, the support members 802 may have a ridge, protrusion or flange 810 formed in a portion of the support member. In many embodiments the ridge, protrusion, or flange may be designed to passively engage a battery cell 804 and/or an auxiliary component 806. In some embodiments the ridge, protrusion or flange may have a hollow cross section for weight savings while other embodiments may be solid cross sections. Although specific designs of the various elements are illustrated, it should be understood that any number of designs may be used in accordance with embodiments of the invention.

SUMMARY & DOCTRINE OF EQUIVALENTS

As can be inferred from the above discussion, the above-mentioned concepts can be implemented in a variety of arrangements in accordance with embodiments of the invention. Specifically, many embodiments include a battery enclosure with multi-functional structural components that can serve as a framework for the enclosure as well structural support for the overall vehicle and cabin components. Achieving such functionality, according to embodiments, involves the implementation of special arrangements/designs between subsystems described above, and their equivalents.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A battery enclosure comprising:
 a pair of longitudinal side rails each having an elongated body with a forward end and a rear end and with an external side and an internal side, wherein each of the longitudinal side rails forms a portion of a framework of a vehicle, and wherein each of the longitudinal side rails provides structural support to the vehicle;
 a forward support element and a rear support element each having an elongated body with opposing ends and disposed laterally between the longitudinal side rails and connected to each of the longitudinal side rails, wherein each of the opposing ends connects to the internal side of a respective one of the longitudinal side rails, wherein the forward support element is disposed at the forward ends and the rear support element is disposed at the rear ends, and wherein the longitudinal side rails and the forward and rear support elements define lateral edges of a sealed space therebetween;
 a plurality of lateral support structures having elongated bodies with opposing ends and disposed between the longitudinal side rails wherein each of the longitudinal side rails, forward and rear support elements, and lateral support structures is configured to provide strength to the battery enclosure and to act as a support feature;
one or more longitudinal support members each having an elongated body disposed longitudinally between the longitudinal side rails, the lateral support structures and the one or more longitudinal support members dividing the sealed space into multiple spaces; and
a plurality of individual battery modules removably disposed within the multiple spaces of the sealed space, wherein each of the battery modules is individually connected to one or more of the lateral support elements;
wherein each longitudinal support member comprises (i) a cross-section that defines a channel configured to receive a connection to at least one of the battery modules and (ii) a ridge, protrusion, or flange configured to engage at least one of the battery modules.

2. The battery enclosure of claim 1, wherein:
each longitudinal support member has a first end and a second end,
the first end of each longitudinal support member is connected to a center portion of one of the forward support element or the rear support element, and
the second end of each longitudinal support member is connected to a center portion of one of the lateral support structures.

3. The battery enclosure of claim 1, further comprising:
a top plate and a bottom plate configured to seal the battery enclosure,
wherein the top plate is secured to a top portion of each of the longitudinal side rails, the forward and rear support elements, and each of the lateral support structures, and
wherein the bottom plate is secured to a bottom portion of each of the longitudinal side rails, the forward and rear support elements, and each of the lateral support structures.

4. The battery enclosure of claim 3, wherein the bottom plate comprises a sacrificial impact layer such that an impact to the bottom plate does not damage the bottom plate beyond the sacrificial impact layer.

5. The battery enclosure of claim 4, wherein the bottom plate comprises a plurality of support ridges, each of the support ridges extending inward towards the sealed space, the support ridges configured to engage with and support the battery modules.

6. The battery enclosure of claim 3, wherein the top plate comprises a plurality of connection points disposed on an outer surface.

7. The battery enclosure of claim 1, further comprising:
a plurality of temperature control elements, wherein each of the temperature control elements is disposed between at least two of the battery modules, and wherein the temperature control elements are configured to receive heat energy from the battery modules.

8. The battery enclosure of claim 7, wherein the temperature control elements are cooling elements.

9. The battery enclosure of claim 7, wherein the temperature control elements are connected to a vehicle temperature control system and are configured to transfer the heat energy to the vehicle temperature control system.

10. The battery enclosure of claim 1, wherein:
first battery modules of the plurality of battery modules are disposed parallel to a longitudinal axis of the framework, and
second battery modules of the plurality of battery modules are disposed perpendicular to the longitudinal axis of the framework.

11. The battery enclosure of claim 1, further comprising:
a plurality of auxiliary components that are interconnected with the battery modules, the auxiliary components configured to transfer energy from the battery modules to other components of the vehicle.

12. The battery enclosure of claim 11, wherein the auxiliary components are connected to the battery modules via wire buses.

13. The battery enclosure of claim 12, wherein each of the lateral support structures has at least one opening disposed within the elongated body of the lateral support structure, the at least one opening extending between two external sides of the elongated body of the lateral support structure, the openings of the lateral support structures configured to allow the wire buses to pass through the openings to connect the battery modules and the auxiliary components.

14. The battery enclosure of claim 11, wherein the auxiliary components comprise at least one of: power management devices, cooling elements, and battery disconnects.

15. The battery enclosure of claim 1, further comprising:
a plurality of battery support elements each connected to at least one of: one or more of the longitudinal side rails or one or more of the lateral support structures,
wherein each of the battery support elements comprises a flange extending inward towards the sealed space and configured to cooperatively engage with at least one of the battery modules.

16. The battery enclosure of claim 1, wherein each of the battery modules is configured to be individually removed and/or replaced.

17. The battery enclosure of claim 1, wherein the longitudinal side rails, the forward and rear support elements, and the lateral support structures form at least part of a vehicle platform that is configured to be connected to a vehicle cabin.

18. The battery enclosure of claim 17, wherein the vehicle platform is an electric vehicle platform.

19. The battery enclosure of claim 18, wherein the electric vehicle platform is a self-contained vehicle platform comprising a drive system and a suspension system integrated within the vehicle platform.

20. An electric vehicle platform comprising:
a sealed battery compartment comprising:
a pair of longitudinal side rails each having an elongated body with a forward end and a rear end and with an external side and an internal side, wherein each of the longitudinal side rails forms a portion of a framework of a vehicle, and wherein each of the longitudinal side rails provides structural support to the vehicle;
a forward support element and a rear support element each having an elongated body with opposing ends and disposed laterally between each of the longitudinal side rails and connected to each of the longitudinal side rails, wherein each of the opposing ends connects to the internal side of a respective one of the longitudinal side rails, wherein the forward support element is disposed at the forward ends and the rear support element is disposed at the rear ends, and wherein the longitudinal side rails and the forward and rear support elements define lateral edges of a sealed space therebetween;
a plurality of lateral support structures having elongated bodies with opposing ends and disposed between the longitudinal side rails, wherein each of the longitudinal side rails, forward and rear support elements, and lateral support structures is configured to provide strength to the sealed battery compartment and to act as a support feature;

one or more longitudinal support members each having an elongated body disposed longitudinally between the longitudinal side rails, the lateral support structures and the one or more longitudinal support members dividing the sealed space into multiple spaces;

a plurality of individual battery modules disposed within the multiple spaces of the sealed space, wherein each of the battery modules is individually connected to one or more of the lateral support elements;

wherein each longitudinal support member comprises (i) a cross-section that defines a channel configured to receive a connection to at least one of the battery modules and (ii) a ridge, protrusion, or flange configured to engage at least one of the battery modules.

\* \* \* \* \*